United States Patent

Ebertin

[15] 3,678,476

[45] July 18, 1972

[54] READ-ONLY RANDOM ACCESS SERIAL MEMORY SYSTEMS

[72] Inventor: Michel A. Ebertin, Yorba Linda, Calif.

[73] Assignee: North American Rockwell Corporation

[22] Filed: Jan. 25, 1971

[21] Appl. No.: 109,557

Related U.S. Application Data

[63] Continuation of Ser. No. 783,536, Oct. 13, 1968, abandoned.

[52] U.S. Cl. ..............340/173 SP, 340/173 AM, 340/173 R, 307/238, 328/37

[51] Int. Cl. ....................................G11c 11/40, G11c 19/00

[58] Field of Search..............340/173 AM, 173 FF; 307/238, 307/279; 327/37

[56] References Cited

UNITED STATES PATENTS 3,083,907 4/1963 Crocker................................340/173

3,353,159 11/1967 Lee........................................340/173

*Primary Examiner*—Terrell W. Fears

*Attorney*—William R. Lane, L. Lee Humphries and Robert G. Rogers

[57] ABSTRACT

A plurality of words each having a variable word length is stored in a memory by selectively connecting input lines for each of the words to storage elements corresponding to each bit position of each word. Storage elements for certain bit positions are connected to an input line or lines having a voltage level representing a logic "1" and the remaining storage elements are connected to an input line having a voltage level representing a logic "0". A read-only memory system is implemented after the connections are made. The lines are actuated to apply the voltage levels to the storage elements. The stored information is shifted out of the memory system during a readout period following the actuation of the lines. The read-only memory may be randomly addressed by actuating a selected input line prior to gating the information from the memory system.

1 Claim, 9 Drawing Figures

INVENTOR.
MICHEL A. EBERTIN

BY Robert G. Rogers
ATTORNEY

INVENTOR.
MICHEL A. EBERTIN
BY
Robert G. Rogers
ATTORNEY

INVENTOR.
MICHEL A. EBERTIN
BY Robert G. Rogers
ATTORNEY

INVENTOR.
MICHEL A. EBERTIN
BY
Robert G. Rogers
ATTORNEY

READ-ONLY RANDOM ACCESS SERIAL MEMORY SYSTEMS

This application is a Continuation of Application, Ser. No. 783,536, filed Dec. 13, 1968, for READ-ONLY RANDOM ACCESS SERIAL MEMORY SYSTEMS, by Michel A. Ebertin now abandoned.

FIELD OF THE INVENTION.

The invention relates to read-only serial memories and more particularly to such memories for randomly reading out of storage one of a plurality of stored words.

It is desirable to provide a basic storage system which can be used as a serial read-only memory, a recirculating memory, or as a temporary storage device for externally generated data by incorporating minor changes and additions to the basic storage configuration. Wafers incorporating the devices of the system can generally be processed to assume the basic memory configuration for all the indicated storage systems. The wafers can be finally processed into a desired form as a function of the specific type of memory desired.

Inventories of the generally processed wafers can be maintained and finally processed as needed with a minimum delay to provide a required memory system. The final process would also make the required connections between input lines and storage elements for fixing a bit pattern for each involved computer word.

SUMMARY OF THE INVENTION

Briefly, the invention comprises storage elements representing bits of a computer word and connected in series by gating devices. The gating devices have inputs connected to lines representing computer words as a function of the logic configuration of a word to be stored and propagated from the system. A logic "1" or a logic "0" is stored at each bit position for each word. By using gating devices having a plurality of inputs representing the bits of a plurality of computer words at that particular position, the storage elements for the memory system can be time shared. In order to prevent error, only one computer word line is actuated during any single period of time.

Either one or a plurality of lines representing computer words can be used depending on the number of computer words desired to be stored in the system. When a word line is actuated, the logic ones and zeros of each bit position of the system are transferred into the storage elements of the system where they are sequentially gated from the last stage of the system by gating signals. The gating signals are actuated after a word line has been actuated to prevent shifting errors.

In other embodiments, the output from the system is fed back to the input while the other lines are inhibited so that the contents of the memory system are recirculated. In such an embodiment, a gate and input line in addition to the word lines, would be required to clear the memory prior to new use.

In another embodiment, additional delay, or storage elements, may be added as a timing means to arbitrarily determine the length of a computer word to be stored. Since the word length is arbitrarily selected, any randomly stored information is cleared by the means used to select the length of a particular word. Such information would not be propagated from the system and would be automatically cleared.

Therefore, it is an object of this invention to provide a basic memory system which can be processed into a plurality of memory systems by minor changes and additions.

It is another object of this invention to provide a serial read-only memory system having a capability for storing one or a plurality of words including the capability for randomly reading out a selected word.

Still another object of the invention is to provide a serial read-only memory system having a capability for varying the word length of the stored information.

A still further object of the invention is to provide a serial read-only memory system having the capability for recirculating stored data.

A still further object of the invention is to provide serial read-only memory system for temporarily storing externally generated data.

A further object of the invention is to provide a serial read-only memory system having the capability for independently selecting one of a plurality of stored words to be read out.

A further object of the invention is to provide a serial read-only memory system in which a stored word is gated from storage by multiple phase gating signals after an input word line has been actuated.

These and other objects of this invention will become more apparent when taken in connection with the description of drawings, a brief description of which follows.

DESCRIPTION OF PREFERRED EMBODIMENTS

Figure 1:
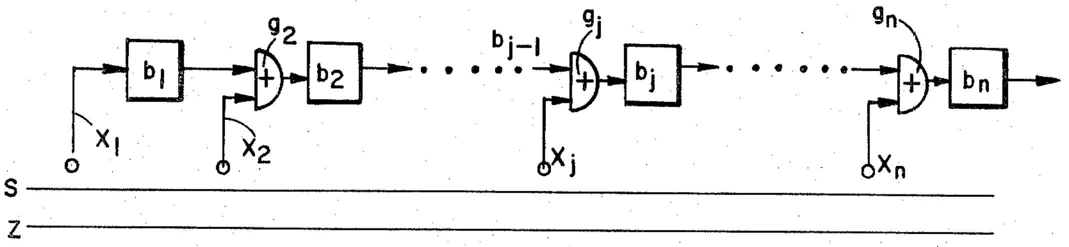
FIG. 1 illustrates a general embodiment of a one-word serial read-only memory.

FIG. 1 illustrates a simple one word memory system which can be used as a shift register having a number of stages, $b_j$ where $1 \leq j \leq n$. Each of the blocks, having outputs $b_1$ through $b_n$, represents a binary delay or storage element of one bit, and each block has an input signal from a preceding OR gate $g_j$, where $j$ is $1<j \leq n$. The input signal to the first storage element, $b_1$, is $x_1$.

The input signals to a particular stage, excluding the first stage, is the logical OR of the signal $x_j$, $1<j \leq n$, and the output signal from a prior stage, $b_{j-1}$. When all the $x_j$ signals are at a logic "0" state, the connected string of storage elements comprises the embodiment of a continuously shifting register whereby information is transferred from a stage, $b_j$, to the succeeding stage, $b_{j+1}$, at every bit time, the speed of which, and method determined by the basic clock repetition rate and the type of clocking (gating) utilized.

Two input lines, Z and S, are provided for each stage. Z is always at a potential equal to logic zero whereas S can be actuated to have a potential equivalent to a logic one for one bit time.

Since no connections are made between the S and Z lines to the stages, $b_j$, comprising the FIG. 1 system, no data is stored. However, a digital word comprised of ones and zeros, can be stored by selectively connecting the $X_j$ inputs of each stage to either the S line or the Z line. The S line is actuated for the duration of one bit time so that the information represented by the connections is gated into the storage elements. The storage elements then shift the information through the stages of the system by means of any one of a plurality of clocking schemes.

Figure 2:
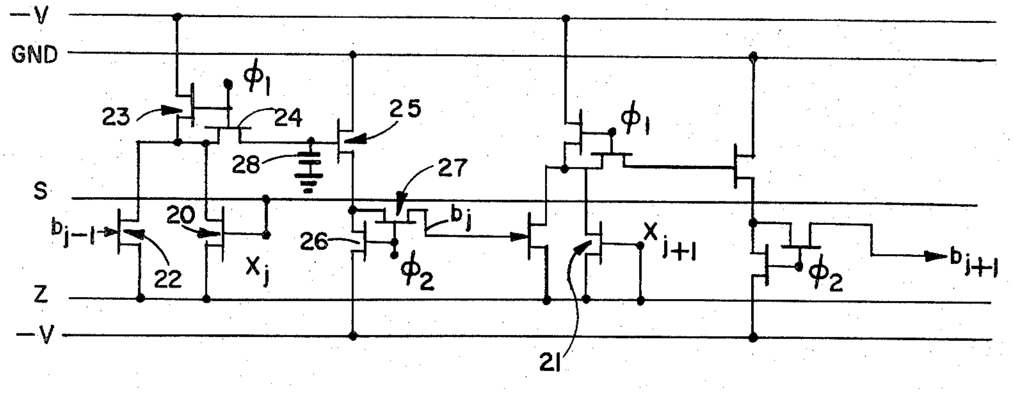
FIG. 2 illustrates a specific embodiment of the FIG. 1 system using a two phase gating system.

FIG. 2 illustrates a specific embodiment of two bit positions $b_j$ and $b_{j+1}$, or stages, of the FIG. 1 system using a two phase gating signal, $\phi_1$ and $\phi_2$. The S line is connected to the $X_j$ input of MOS device 20 so that a logic 1 is stored at the first bit position. Similarly, the $X_{J+1}$ input of MOS device 21 is connected to the Z line for storing a logic zero at the second bit position.

In operation, the S line is actuated for one bit time ($\phi_1+\phi_2$) so that $X_j$ is high and MOS device 20 is turned on. When $X_j$ is low, and the output from a previous bit position, $b_{j-1}$, is high, MOS device 22 would be turned on. The combination of MOS devices 20 and 22 are represented in FIG. 1 by OR gate $g_j$. Therefore, if the input of either device is high, during phase one time, $\phi_1$, devices 23 and 24 are turned on. Since either device 20 or 22 is turned on, a ground level is connected to the gate of MOS device 25 and that device remains off.

During phase two, $\phi_2$, MOS devices 26 and 27 are turned on and the output $b_j$ becomes high (−V). MOS device 25 remains off. During the next bit time, $\phi_1$ and $\phi_2$, the high output at $b_j$ is shifted through the next stage, $b_{j+1}$. The shifting is continued until the data from the first stage is shifted out of the last stage (not shown).

As an additional example, assume that a logic zero is stored in the first stage of the memory system shown in FIG. 2 by connecting the $X_j$ terminal to the Z line instead of the S line. MOS device 25 would be turned on during $\phi_1$ time since MOS devices 20 and 22 would be turned off. The output of the stage $b_j$, would be set to ground during $\phi_2$ time. MOS device 25 remains on during $\phi_2$ time because capacitor 28, representing the distributed conductor capacitance of MOS devices, stores charge representing the potential, −V, until discharged to ground through MOS devices 22 and 20.

Figure 3:
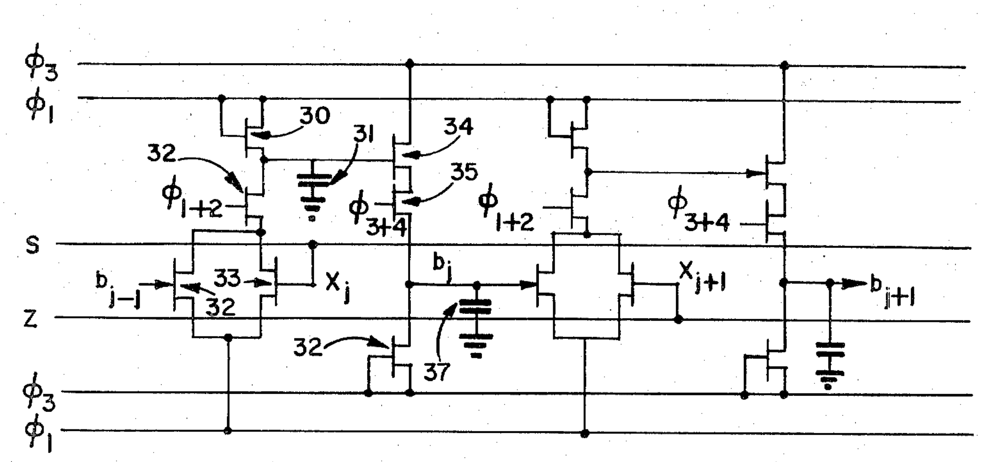
FIG. 3 illustrates a serial read-only memory system including storage elements gated by multiple phase gating signals.

The FIG. 1 system can also be mechanized for a four phase gating scheme as shown in FIG. 3. FIG. 3 shows the mechanization concept for two consecutive stages, $b_j$ and $b_{j+1}$. The $X_j$ point is connected to the S line to program (store) a logic 1 in bit position $j$ of the computer word. $X_{j+1}$ is connected to the Z line in order to program a logic 0 in bit position $j+1$ of the computer word.

In the FIG. 3 system, during $\phi_1$ time, MOS device 30 is turned on for charging an effective capacitor 31 consisting of the distributed capacitance at the output of device 30, the gate of MOS device 34 and the capacitance of the logic structure. MOS device 34 is then turned on. During phase two time, $\phi_2$, MOS device 34 is still on and the output capacitance 31 is discharged to ground ($\phi_1$). Thus MOS device 34 is turned off. Thereafter, during phase three time, $\phi_3$, MOS device 35 and MOS device 36 are turned on for setting the output of the stage $b_j$ high by charging effective capacitor 37. During $\phi_4$ time, device 35 is still turned on, but since device 34 is turned off, the output remains high. It can be seen therefore that the logic 1 input at the first stage $b_j$ is shifted to the next stage $b_{j+1}$. The shifting is continued as indicated in connection with FIG. 2 until all the stored information is shifted out of the system.

Figure 4:
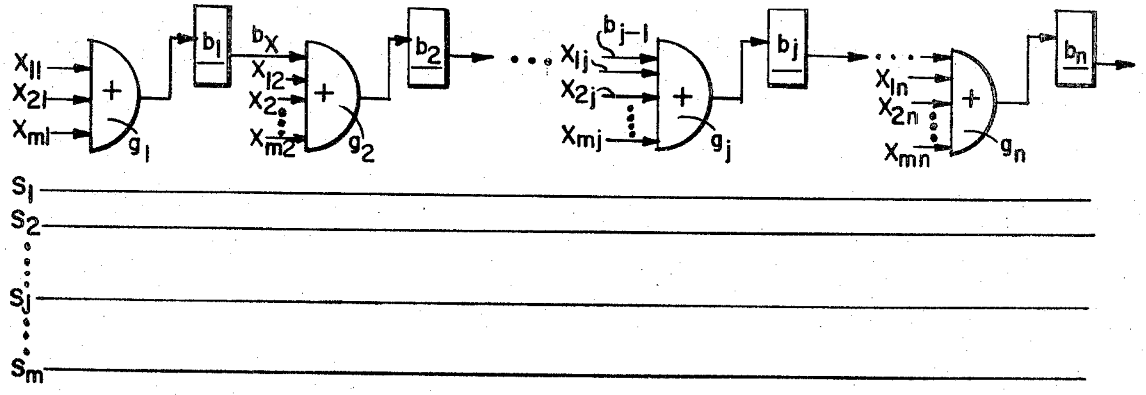
FIG. 4 illustrates a block diagram of one embodiment of a system for storing a plurality of m computer words of n bits in length with the capability for randomly reading out any of the stored words.

FIG. 4 illustrates a general case of a memory system for storing a plurality of words, $m$, having a word length, $n$, in a serial memory configuration which permits random access to the stored data. The configuration is similar to the FIG. 1 system except that each of the OR gates, $g_j$, has a plurality of inputs equal to the number of words capable of being stored by the system plus the output from the previous stage.

The first stage only has inputs from each of the computer words lines $S_1$ through $S_m$ as indicated by the input notations $X_{11}$, $X_{21}$ thru $X_{m1}$. The first digit of the subscript notation indicates the word number and the second digit indicates the bit position of the particular input. For example, inputs to the final stage are $X_{1n}$ through $X_{mn}$, indicating that the stage represents bit position n for computer words 1 thru $m$. The delay element for the stage, $b_j$, is similar to the delay element shown and described in FIGS. 2 and 3.

By selectively connecting the inputs from the OR gates, $g_j$, to the word lines, words having desired logical configurations can be stored by the system. Thereafter, by actuating a desired word line, each bit of a particular word is simultaneously gated into each respective stage of the shift register and propagated under the control of a multiphase clock, or gating signal.

Figure 5:
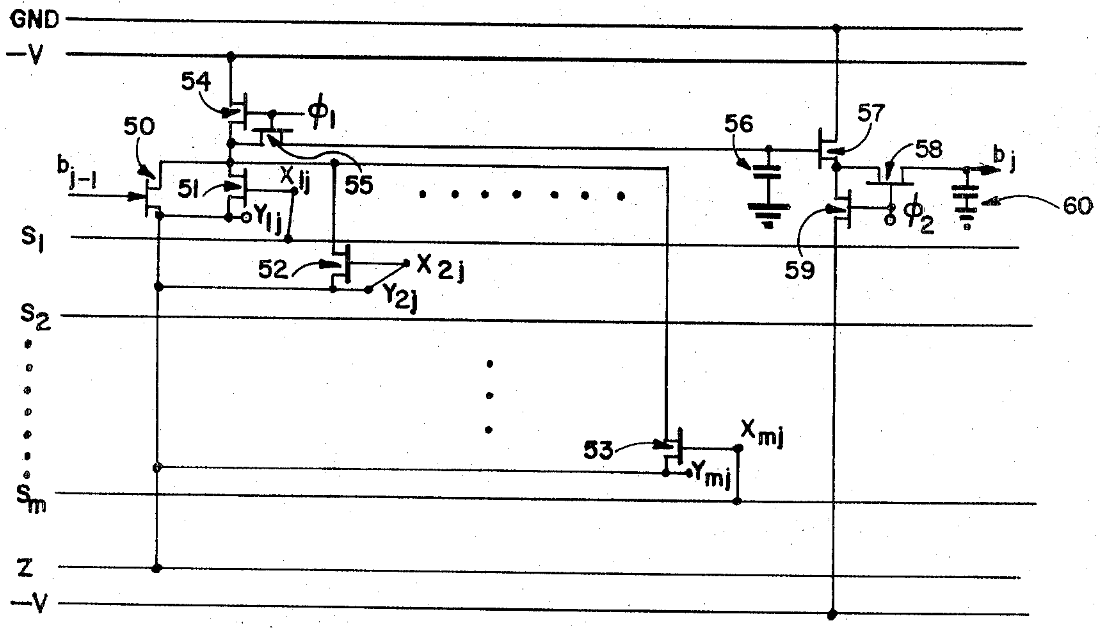
FIG. 5 illustrates a specific embodiment of the FIG. 4 system using a two phase clocking scheme wherein interconnection points are provided for storing desired bit patterns.

FIG. 5 is an illustration of a specific embodiment of the FIG. 4 system in which the OR gate configuration, $g_j$, is shown with a storage element for the stage element $b_j$. In general, programming a logic 1 for bit $j$ of word 1 consists of connecting input, $X_{1J}$, to the word line $S_1$. Each point, $Y_{1j}$ through $Y_{mJ}$ consists of an electrical extension of the Z line. Thus, programming of a logic 0 in bit position $j$ of word 1 is performed by the connection of input point $X_{1J}$ to $Y_{1Jl}$. *Bit position* $j$ of word one is programmed as a logic 1. Bit position $j$ of word two is programmed as a logic 0 and bit position $j$ of the word $m$ is programmed as a logic 1.

During $\phi_1$ time, MOS devices 54 and 55 are turned on to charge effective capacitor 56. However, if any one of MOS devices 50, 51, 52, . . . ,53, comprising OR gates, $g_j$, is ON during $\phi_1$ time, capacitor 56 will be discharged by the end of $\phi_1$ time. Thus, MOS device 57 will be turned OFF. During $\phi_2$ time MOS devices 58 and 59 are turned on and the distributed capacitor 60, at the output of stage, $b_j$, will be charged or discharged depending on whether MOS device 57 is OFF or ON respectively. Thereafter, since all the $S_1$'s are OFF, during each bit time, information is propagated from one stage to the subsequent stage so that after n bit times all the stored information for a particular word, S has been shifted out of memory.

Figure 6C:
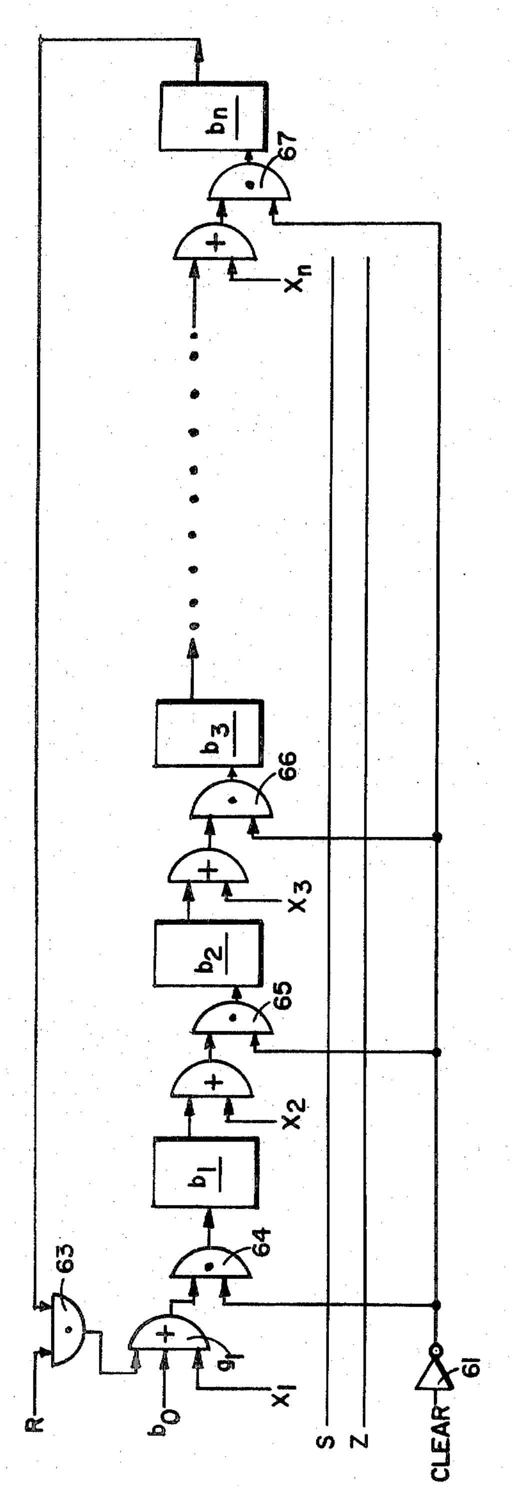
FIG. 6*c* illustrates a further modification of the FIG. 6*a* system for parallel clearing of the memory prior to a new use.
Figure 6A:
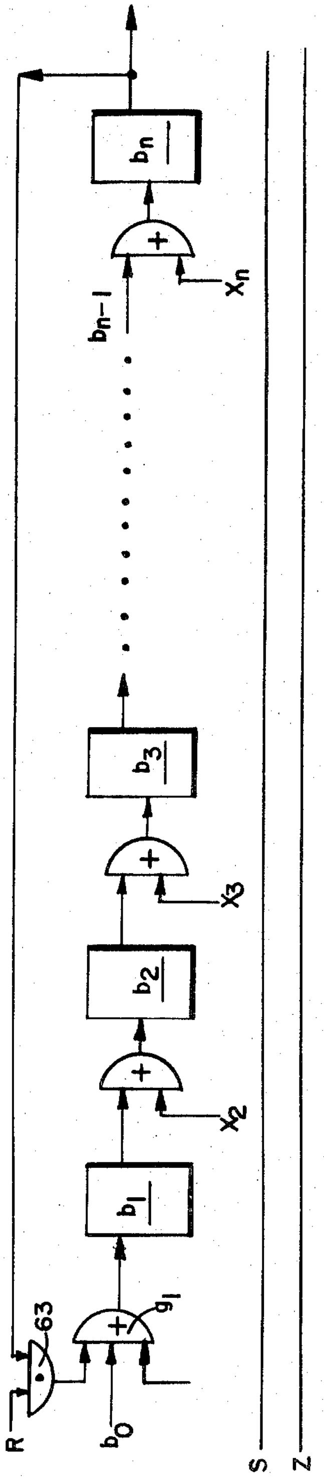
FIG. 6*a* illustrates a modification of the FIG. 4 system having the capability for recirculating data.

FIG. 6*a* illustrates an embodiment of the basic memory system having the capability for receiving externally generated data at the $b_o$ input into the first stage. Thus, when S is off, external words may be passed through the memory system in order to implement a simple $n$-bit shift register.

In addition, the data can be recirculated by gating the information from the output stage $b_n$ through AND gate 63 into OR gate $g_1$ for stage $b_1$. The AND gate 63 has a control input, R, for actuating the gate in order to permit a recirculation.

Figure 6B:
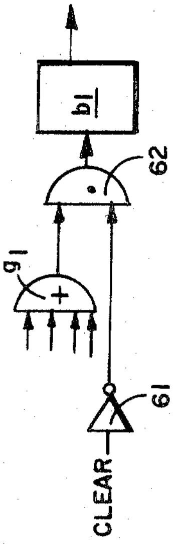
FIG. 6*b* illustrates a modification of the FIG. 6*a* system for serially clearing the memory prior to a new use.

After the system has been operated as a register, it is probable that certain bit positions may contain data representing a logic 1. Therefore, before information can be placed into the storage elements by actuating the S line as shown in FIG. 4, the system must be cleared. An AND function (gate 62) may be added between the OR gate $g_1$ and the $b_1$ stage as shown in FIG. 6*b*. The inputs to AND gate 62 are the output of gate $g_1$ and the output of inverter 61. The input to the $b_1$ stage is at logic state zero. The clear line should remain actuated for $m$ bit times in order to clear the entire register.

In an alternate embodiment as shown in FIG. 6*c*, similar AND gates 64, 65, 66 and 67 may be connected to inputs of each stage so that the system can be cleared in one bit time as contrasted with $n$ bit times for the FIG. 6C embodiment.

It should be pointed out that FIGS. 6*a* and 6*b* do not indicate connections between the stages and the single word lines S and Z. Obviously, in a practical system such connections would be made to the S and Z lines as well as to other S lines (see FIG. 4) as would be required to implement a memory having a plurality of phased stored read-only data. Connections between the lines and the stages would also be required to permit use of the system as a temporary storage for external data or for recirculating any one of the stored computer words as described above.

Figure 7:
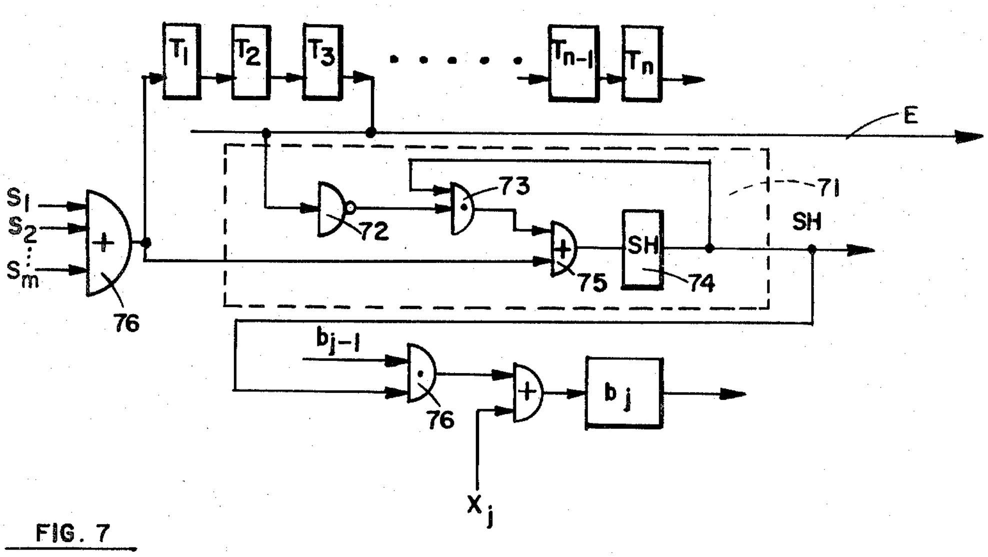
FIG. 7 is an illustration of a serial read-only memory having the capability for varying the length of a stored computer word.

FIG. 7 shows an embodiment of the memory system which includes the capability for varying a computer word length. Delay elements $T_1$ through $T_n$ implement a simple shift register with the input to any stage, $T_j$, being the output of the preceding stage, $T_{j-1}$. $T_1$ receives as an input the logical OR of all computer word lines $S_1$ thru $S_m$ connected as inputs to OR gate 70.

The output of only one particular stage, $T_j$, is connected to the E line as an indication of the desired length of $j$ bits of a particular computer word. For example, if a word length of 3 bits is required, the E line would be connected to the output of the $T_3$ stage.

Shift Logic 71 comprises Nand gate 72 which logically inverts the state of line E and provides an input to AND gate 73. AND gate 73 also receives the output of delay element, SH, so as to pass the output signal from SH through OR gate 75 as long as the logic state of E is FALSE (logic 0). The input to delay element SH is the logic OR of the output of gate 73 and gate 70. The application equation for delay element SH is $$(SH)^{k+1}=(S_1+S_2+S_3+\ \ldots\ S_m+SH\cdot\overline{E})^k$$

where the superscript k and k+1 indicate the bit time relationships between inputs and outputs. The output signal from *SH* is a control signal which is used by the memory elements to allow the shifting operation from one stage to the next to occur. Thus, when *SH* is ON, information shifts through the string of delay elements. When *SH* is OFF, shifting is inhibited, thus clearing the memory elements. The occurrence of any signal $S_i$ will simultaneously cause *SH* to turn ON and load the corresponding binary bits pattern of word *i* into each storage element $b_j$ (as shown in FIGS. 1 thru 5).

The E line is used to indicate the occurrence of the last bit of the computer word. Any input to OR gate 70 becomes true (ON) for only one bit time, but it propagates through the T register and through OR gate 75 to cause SH to become true (ON) one bit time later. It stays true until E becomes true. This sequence of events may be referred to as the initiation of a shift cycle, normal shifting, and termination of shift cycle.

The SH output is also connected to AND gate 76 which is interposed between each of the $b_{j-1}$ state and $b_j$ stages of the particular memory system under consideration. The other input to the AND gate 76 is received from the previous stage $b_{j-1}$. It comprises logical information gated through the stages as a function of the logical state of the inputs. As long as the SH line is high (true) information from $b_{j-1}$ is shifted to the input of stage $b_j$. However, when the SH line is low, no further information can be shifted through the memory system.

As a result, the system has an immunity to noise or transients which may arbitrarily set a non-used stage to a logic 1. For example, if any stage is erroneously set to a logic 1 by noise energy, the logic 1 will not propagate through the system because shifts of data are inhibited by the SH control signal after a number of intervals equivalent to the number of bit conditions of a computer word have lapsed. A random logic 1 is automatically cleared during bit time following the last bit position of the computer word because of the characteristics of the clocking system previously described.

Although the invention has been described and illustrated in detail, it is to be understood that the same is by way of illustration and example only, and is not to be taken by way of limitation; the spirit and scope of this invention being limited only by the terms of the appended claims.

What is claimed is:

1. A serial memory system comprising, a plurality of storage means, including means for connecting said storage means in series for forming consecutive bit positions of a computer word, at least one input line representing a first logic state, and a line representing a second logic state, selected ones of the storage means being connected to an input line representing the first logic state and the remaining storage means being connected to the line representing the second logic state for forming the bit configuration of a particular computer word, means for providing a voltage level representing said first logic state to an input line for placing the bit configuration of a particular computer word in said storage means including means for providing a voltage level representing said second logic state to the line representing said second logic state, and means for gating said computer word from said storage means, and means for varying the length of a computer word comprising timing means for inhibiting the gating of information between the bit positions after information has been gated through bit positions equal to the varied length of the computer word, said timing means being actuated when a selected one of said input lines are actuated for placing a computer word into selected bit positions of said plurality of storate means, said positions being selected as a function of a predetermined computer word length, said timing means including means for generating a signal for inhibiting further gating after a number of intervals equivalent to the number of the bit positions of the computer word have lapsed.

* * * * *